(12) United States Patent
Barton et al.

(10) Patent No.: US 6,287,722 B1
(45) Date of Patent: Sep. 11, 2001

(54) CONTINUOUS MELT PROCESS FOR FABRICATING IONICALLY CONDUCTIVE ARTICLES

(75) Inventors: Kelly David Barton, Athens, PA (US); Christopher Marc Doyle; William Brown Farnham, both of Hockessin, DE (US); Charlie David Lang, Wysox, PA (US); Antonio Vidal, Wilmington, DE (US)

(73) Assignee: E. I. du Pont Nemours and Co., Wilmington, DE (US)

( * ) Notice: Subject to any disclaimer, the term of this patent is extended or adjusted under 35 U.S.C. 154(b) by 0 days.

(21) Appl. No.: 09/383,129

(22) Filed: Aug. 25, 1999

Related U.S. Application Data

(60) Provisional application No. 60/122,353, filed on Mar. 2, 1999, and provisional application No. 60/122,696, filed on Mar. 3, 1999.

(51) Int. Cl.⁷ ...................................................... H01M 2/04
(52) U.S. Cl. .......................... 429/176; 429/213; 526/243; 526/247; 526/255
(58) Field of Search .................................... 429/176, 309, 429/315, 316, 317, 231.8, 231.1, 326, 330, 213; 526/243, 247, 255

(56) References Cited

U.S. PATENT DOCUMENTS

| 4,818,643 | 4/1989 | Cook et al. | 429/188 |
|---|---|---|---|
| 5,418,091 | 5/1995 | Gozdz et al. | 429/252 |
| 5,470,357 | 11/1995 | Schmutz et al. | 29/623.5 |
| 5,725,822 | 3/1998 | Keller et al. | 264/211.11 |
| 6,025,092 * | 2/2000 | Doyle et al. | 429/213 |

FOREIGN PATENT DOCUMENTS

| WO 97/44847 | 11/1997 | (WO) . |
|---|---|---|
| WO 98/20573 | 5/1998 | (WO) . |

OTHER PUBLICATIONS

Xue (Ph.D. thesis, Clemson University, 1996).

* cited by examiner

*Primary Examiner*—Laura Weiner

(57) ABSTRACT

The invention concerns a process for melt forming conductive compositions comprising ionomers into multi-layer electrochemical cells suitable for use in electrochemical applications such as batteries, fuel cells, electrolysis cells, ion exchange membranes, sensors, electrochemical capacitors, and modified electrodes.

32 Claims, No Drawings

CONTINUOUS MELT PROCESS FOR FABRICATING IONICALLY CONDUCTIVE ARTICLES

This application claims priority benefit of U.S. Provisional Application No. 60/122,353, filed Mar. 2, 1999 and U.S. Provisional Application No. 60/122,696, filed Mar. 3, 1999.

FIELD OF THE INVENTION

The present invention involves a process for melt forming conductive compositions comprising ionomers into multi-layer electrochemical cells suitable for use in electrochemical applications such as batteries, fuel cells, electrolysis cells, ion exchange membranes, sensors, electrochemical capacitors, electro-chromic windows, and modified electrodes. Of particular interest is the use in lithium batteries.

BACKGROUND

Cook et al., U.S. Pat. No. 4,818,643, discloses an extrusion process of polymer electrolyte materials and/or cathode materials, optionally extruded onto other components of a cell, including current collectors, sequentially or by coextrusion. Example 8 therein describes the addition of propylene carbonate to a melt blend of polyethylene oxide and salt in a second extrusion stage.

Gozdz et al., U.S. Pat. No. 5,418,091, discloses a "dry film" process involving the use of a temporary plasticizer in an electrolyte composition comprising a copolymer of vinylidene fluoride (VF2) and hexafluoropropylene (HFP), the temporary plasticizer being employed to provide voids in the solid polymer after removal thereof, and the temporary plasticizer being removed in a later step and subsequently replaced by of the hygroscopic lithium salt solution. The temporary plasticizer permits the early stages of the cell formation process to be run without undue concern about moisture. Gozdz does not disclose a melt extrusion process.

Schmutz et al., U.S. Pat. No. 5,470,357, discloses melt extrusion of the compositions of Gozdz, op.cit. Schmutz teaches a process of pretreating the current collector with a solution of a polymer similar to the polymer of the solid polymer electrolyte to facilitate lamination. The lamination may be performed utilizing calender rolls. The process otherwise is similar to that of Gozdz.

Chern et al., WO 97/44847 discloses an extrusion process for forming an activated electrode suitable for use in batteries, the process comprising mixing a non-ionic polymer, an electrode-active material, a salt, and organic carbonates and feeding the mixture to the feed zone of an extruder, mixing the ingredients therein, and extruding a film suitable for laminating to other components of the battery.

Keller et al., U.S. Pat. No. 5,725,822 discloses extrusion of an activated electrode composition the process comprising feeding a mixture of a (non-ionic) polymer, an electrode-active material, a salt, and organic carbonates to the upstream end of a screw extruder, and feeding additional solvent (or possibly a mixture of polymer and solvent) at a downstream port. The amount of solvent in the first feeding stage is adjusted to provide a melt undergoing sufficient shear that good mixing will occur, and the amount of solvent being fed in the second stage being adjusted so that the total amount of solvent represents the final amount in the finished electrode material. The extruded electrode may be deposited onto a current collector and/or coated with a layer of solid polymer electrolyte. Assembly of a lithium battery cell from thus extruded components is also disclosed.

Doyle et al., WO 98/20573, disclose the use of perfluoroionomers to form the electrodes and separators of electrochemical cells. In particular, the lithium ionomers are employed to form lithium-ion cells. The electrodes and separators are formed by casting solutions and dispersions onto a substrate, followed by a drying step, which in turn is followed by a solvent contact step. Combination of these components into electrochemical cells is also disclosed.

SUMMARY OF THE INVENTION

The present invention provides for a process for forming ionically conductive shaped articles, the process comprising:

combining in a vessel provided with a mixing means a polymer comprising monomer units of vinylidene fluoride and 2–50 mol-% of a perfluoroalkenyl monomer unit having a pendant group comprising the radical represented by the formula $$-(OCF_2CFR)_aOCF_2(CFR')_bSO_2X^-(M^+)[YZ_c]_d \qquad (I)$$

wherein

R and R' are independently selected from F, Cl or a perfluoroalkyl group having 1 to 10 carbon atoms, optionally substituted by one or more ether oxygens;

a=0, 1 or 2;

b=0 to 6;

$M^+$ is $H^+$ or a univalent metal cation;

X is O, C or N with the proviso that d=0 when X is O and d=1 otherwise, and c=1 when X is C and c=0 when X is N;

when c=1, Y and Z are electron-withdrawing groups selected from the group consisting of CN, $SO_2R_f$, $SO_2R^3$, $P(O)(OR^3)_2$, $CO_2R^3$, $P(O)R^3_2$, $C(O)R_f$, $C(O)R^3$, and cycloalkenyl groups formed therewith wherein $R_f$ is a perfluoroalkyl group of 1–10 carbons optionally containing one or more ether oxygens;

$R^3$ is an alkyl group of 1–6 carbons optionally substituted with one or more ether oxygens, or an aryl group optionally further substituted;

or, when c=0, Y may be an electron-withdrawing group represented by the formula $-SO_2R_f'$ where $R_f'$ is the radical represented by the formula $$-(R_f''SO_2N^-(M^+)SO_2)_mR_f'''$$

where m=0 or 1, and $R_f''$ is $-C_nF_{2n}-$ and $R_f'''$ is $-C_nF_{2n+1}$ where n=1–10 and, a polar aprotic liquid to form a composition; mixing said composition at least until it is plastically formable; and, forming a shaped article from said plastically formable composition by the application of heat and/or pressure thereto.

The present invention further provides a shaped article made by the process of the invention.

The present invention further provides an electrochemical cell formed from one or more shaped articles of the invention.

The present invention still further provides for a process for forming an electrochemical cell, the process comprising combining in a vessel provided with a mixing means a polymer comprising monomer units of vinylidene fluoride and 2–50 mol-% of a perfluoroalkenyl monomer unit having a pendant group comprising the radical represented by the formula $$-(OCF_2CFR)_aOCF_2(CFR')_bSO_2X^-(M^+)[YZ_c]_d \qquad (I)$$

wherein
R and R' are independently selected from F, Cl or a perfluoroalkyl group having 1 to 10 carbon atoms, optionally substituted by one or more oxygens;
a=0, 1, or 2;
b=0 to 6;
$M^+$ is $H^+$ or a univalent metal cation;
X is O, C or N with the proviso that d=0 when X is O and d=1 otherwise, and c=1 when X is C and c=0 when X is N;

when c=1, Y and Z are electron-withdrawing groups selected from the group consisting of CN, $SO_2R_f$, $SO_2R^3$, $P(O)(OR^3)_2$, $CO_2R^3$, $P(O)R^3{}_2$, $C(O)R_f$, $C(O)R^3$, and cycloalkenyl groups formed therewith wherein $R_f$ is a perfluoroalkyl group of 1–10 carbons optionally containing one or more oxygens;

$R^3$ is an alkyl group of 1–6 carbons optionally containing oxygen, or an aryl group optionally further substituted; or, when c=0, Y may be an electron-withdrawing group represented by the formula —$SO_2R_f'$ where $R_f'$ is the radical represented by the formula

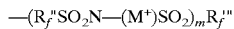

where m=0 or 1, and $R_f''$ is —$C_nF_{2n}$— and $R_f'''$ is —$C_nF_{2n+1}$ where n=1–10. and, a polar aprotic liquid to form a composition; mixing said composition at least until it is plastically formable; and, forming a shaped article from said plastically formable composition by the application of heat and/or pressure thereto; layering said shaped article with such other shaped articles as are required to make an electrochemical cell; and, consolidating said layered shaped articles to form an electrochemical cell.

DETAILED DESCRIPTION

Highly conductive compositions comprising fluorinated ionomers provide numerous advantages in use in electrochemical applications such as lithium batteries. They are single ion conductors not susceptible to performance degrading charge polarization, exhibit high stability, and can be combined with aprotic polar solvent to provide highly conductive compositions. It is well-recognized that continuous melt processibility of the components of a battery provides a significant reduction in manufacturing cost over processes which depend upon casting and drying of solutions and dispersions. It is of particular benefit to be able to produce electroactive components in a single processing step rather than through numerous solvent handling steps. However, the fluorinated ionomers known in the art, the best known of which is Nafion® perfluoroionomer film and resin available from DuPont, Wilmington Del., do not exhibit melt processibility, thus placing the fluorinated ionomers of the art at a disadvantage with respect to the alternative approaches in the art which do allow for melt processing. The melt processable ionomers known in the art, such as cation-neutralized ethylene-methacrylic acid copolymers sold under the trade name Surlyn® by DuPont, Wilmington, Del., do not provide conductive compositions with the desirable high levels of conductivity when combined with polar solvents.

The present invention provides a process for forming conductive shaped articles, the process comprising combining a fluorinated ionomer with an aprotic polar liquid, mixing the ingredients to form a plastically formable composition, and forming the composition into a shaped article. The process depends upon the surprising plastic formability of the composition. The present process provides immense benefits over the art. For the first time, a fluorinated ionomer can be processed into conductive components suitable for use in electrochemical cells in a process which does not involve forming solutions or liquid or gelled dispersions, nor liquid casting steps, nor extraction steps. In the process of the present invention, a conductive composition needed to form an electrochemical component having all the benefits provided by fluorinated ionomers is prepared in a single process step.

The process of the invention is particularly beneficial as a manufacturing process because it affords considerable improvement in compositional control over methods taught in the art. The fluorinated ionomers suitable for use in lithium batteries need to be combined with the solvents hereinbelow recited in order to provide the conductivity required for practical utility in lithium batteries. However, suitable ionomers often readily absorb excess amounts of solvent, thus actually degrading battery performance. Controlling the process of solvent uptake is therefore a critical quality issue. The process of the present invention allows for the strict control of composition in contrast to the solvent casting processes of the art.

In the process of the invention, a fluorinated ionomer is combined and mixed with an aprotic polar liquid to make a plastically formable composition. A plastically formable composition is one which can be molded to a shape by the application of heat and/or pressure, and which will retain the shape to which it has been molded upon removal of the heat and/or pressure by which it was formed. Mixing is performed at a temperature at which the ionomer/liquid combination forms a plastically formable viscous mass.

Suitable for the practice of the invention are polymers comprising monomer units of vinylidene fluoride and 2–50 mol-%, preferably 2–20 mol-%, most preferably 4–12 mol-%, of a perfluoroalkenyl monomer unit having a pendant group comprising the radical represented by the formula

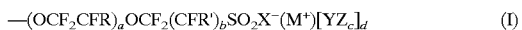

wherein R and R' are independently selected from F, Cl or a perfluoroalkyl group having 1 to 10 carbon atoms, optionally substituted by one or more oxygens;
a=0, 1 or 2;
b=0 to 6;
$M^+$ is $H^+$ or a univalent metal cation;
X is O, C or N with the proviso that d=0 when X is O and d=1 otherwise, and c=1 when X is C and c=0 when X is N;

when c=1, Y and Z are electron-withdrawing groups selected from the group consisting of CN, $SO_2R_f$, $SO_2R^3$, $P(O)(OR^3)_2$, $CO_2R^3$, $P(O)R^3{}_2$, $C(O)R_f$, $C(O)R^3$, and cycloalkenyl groups formed therewith wherein $R_f$ is a perfluoroalkyl group of 1–10 carbons optionally containing one or more oxygens;

$R^3$ is an alkyl group of 1–6 carbons optionally containing oxygen, or an aryl group optionally further substituted;

or, when c=0, Y may be an electron-withdrawing group represented by the formula —$SO_2R_f'$ where $R_f'$ is the radical represented by the formula —$(R_f''SO_2N-(M^+)so_2)_mR_f'''$ where m=0 or 1, $R_f''$ is $C_nF_{2n}$ and $R_f'''$ is $C_nF_{2n+1}$ each optionally substituted by one or more hydrogens and where n=1–10.

Preferably, a=0 or 1, R=$CF_3$, R'=F, b=1, and when X is C, Y and Z are CN or $CO_2R^3$ where $R^3$ is $C_2H_5$, while when X is N, Y is preferably $SO_2R_f$ where $R_f$ is $CF_3$ or $C_2F_5$ and $M^+$ is H⁺ or alkali metal cation. Most preferably M⁺ is a lithium cation. Most preferred are lithium perfluorosulfonate ethoxy propyl vinyl ether (Li-PSEPVE) and the methide and imide derivatives thereof as hereinabove described.

Further encompassed in the present invention are terpolymers comprising 0–20 mol-% of monomer units selected from the group consisting of tetrafluoroethylene, trifluoroethylene, chlorotrifluoroethylene, vinyl fluoride, hexafluoropropylene, perfluoromethyl vinyl ether, perfluoroethyl vinyl ether, ethylene, propylene, 1-octene, isobutylene, ethyl vinyl ether, acrylic acid and the alkyl esters thereof, and methacrylic acid and the alkyl esters thereof, and mixtures thereof.

Aprotic polar solvents suitable for the practice of the invention include the linear and cyclic carbonates, esters, diesters, lactones, amides, sulfoxides, sulfones, and ethers. Preferred solvents are mixtures of cyclic carbonates, diesters, or lactones such as ethylene carbonate, propylene carbonate, butylene carbonate, vinylene carbonate, dimethyl succinate, diethyl succinate, dimethyl glutarate, dimethyl adipate, gamma-butyrolactone, fluoro or chloro-substituted cyclic carbonates mixed with linear carbonates such as dimethyl carbonate, diethyl carbonate, dipropyl carbonate, ethyl methyl carbonate, methyl propyl carbonate, and fluoro and chloro substituted linear carbonates. Especially preferred are mixtures of ethylene carbonate and gamma-butyrolactone, ethylene carbonate and dimethyl succinate, and of ethylene carbonate and propylene carbonate. Most preferred are mixtures of ethylene carbonate with propylene carbonate in weight ratios of from 50:50 to 80:20.

In one preferred embodiment the process of the invention is employed to produce an ionically conductive separator membrane. In this embodiment, a composition is formed comprising 10–50%, preferably 15–30%, by weight of a preferred lithium ionomer and 50–90%, preferably 70–85%, by weight of a preferred solvent mixture. The mixture so formed may optionally contain an inert filler at a concentration of less than 50%, preferably less than 20%, by weight of the total weight of ionomer/solvent mixture. Additionally, it is preferable to add a small amount of a mobile lithium salt to the combination the amount being less than 15%, preferably less than 10%, by weight of the total weight of ionomer/solvent mixture.

Suitable inert fillers include non-swelling polymers, fibers, or porous substrates such as polyvinylidene fluoride (PVDF) homopolymer, polytetrafluoroethylene (PTFE) homopolymer, or polyolefins, solvent swellable polymers such as polyvinylidene fluoride-hexafluoropropylene copolymers, polyurethane, polyalkylene oxides, polyacrylonitrile, polymethyl methacrylate, or copolymers of any of these, and non-conducting ceramic particles such as $TiO_2$, $SiO_2$, zeolites, or $Al_2O_3$. Also included are organic compounds such as aromatic compounds such as benzene derivatives such as substituted anisoles added for safety-related purposes or overcharge or overdischarge protection for the battery, or nondissociating salts such as LiX where X=halide or carbonate.

Suitable mobile salts for combining with the most preferred lithium ionomer include $LiPF_6$, $LiPF_xR_{fy}$, $LiBF_4$, $LiAsF_6$, $LiClO_4$, lithium borates, $LiSO_3R_f$, $LiN(SO_2R_f)(SO_2R_f)$, $LiC(SO_2R_f)(SO_2R_f)(SO_2R_f)$, and mixtures thereof, where the "f" subscript denotes partial or complete fluorination. The $R_f$ groups are electron-withdrawing, and may respectively be the same or different from one another. Preferably $R_f$=$CF_3$, $CF_2CF_3$, or $C_4F_9$. Most preferred are $LiPF_6$ or $LiN(SO_2CF_2CF_3)_2$.

It will be understood by one of skill in the art that such other adjuvants as are commonly employed in the art to facilitate processing, impart oxidative or photochemical stability, or such other desirable modifications as are commonly achieved in the art, may also be employed in the practice of the present invention so long as these adjuvants make no substantive changes in the desirable results of the present invention or the methods employed to achieve them.

Mixing in the process of the invention can be accomplished by any convenient means known in the art. Depending upon the melting or softening point of the conductive composition being employed, heating may be necessary to provide sufficient mixing to achieve the desired plastically formable composition. Mixing may be performed in batches or continuously. Examples of suitable mixing apparatus are screw extruders, roll mills, high intensity batch mixers such as Brabenders.

In a preferred embodiment of the present invention, the ingredients of the preferred plastically formable composition are fed continuously to an extruder pre-heated to a temperature in the range of 25 to 180° C. wherein the ingredients are mixed to form a homogeneous composition, and the composition is then extruded through a film die to form a separator membrane which is in the electrochemically activated state as extruded. In order to achieve best results, it is necessary to take provision that the feeding and mixing are performed in an anhydrous atmosphere.

It will be understood by one of skill in the art that feeding may be performed in a single stage or in multiple stages according to methods known in the art depending upon the particular ingredients employed and the rheological requirements to attain good mixing.

Shaped articles can be formed according to the process of the invention by any means known in the art. In a preferred embodiment the plastically formable composition is extruded through a flat or circular film or sheet die. In the alternative, the plastically formable composition may be compression molded into a film or sheet. The film or sheet so formed can be further formed into articles of more complex shape by thermoforming. In another embodiment, the shaped articles can be formed by injection molding.

In a further preferred embodiment of the invention, an anode is formed by mixing and extruding into film a composition comprising, by weight, 5–20%, preferably 8–10%, of a preferred lithium ionomer, 10–60%, preferably 20–30%, of a preferred solvent mixture, 40–80%, preferably 60–65%, of electrode-active material, and 1–10%, preferably 2–4%, of a conductive additive. Optionally up to 12% of an inert filler or up to 10% of a mobile lithium salt as hereinabove described may also be added, as may such other adjuvants as may be desired by one of skill in the art which do not substantively affect the achievement of the desirable results of the present invention. It is preferred that no filler be used, and that no more than 5% of a mobile lithium salt be used.

The electrode active material suitable for use in the process for forming an anode include carbons such as coke or graphite, metal oxides such as titanium oxides, iron oxides, or tin oxides or lithium-alloy-forming compounds of tin, silicon, antimony, or aluminum such as those disclosed in "Active/Inactive Nanocomposites as Anodes for Li-Ion Batteries," by O. Mao et al. in *Electrochemical and Solid State Letters*, 2 (1), p. 3, 1999. Particle size of the active material should range from about 1 to 100 microns. Preferred are graphites such as carbon microbeads, natural graphites, or carbon fibers. Especially preferred are graphite microbeads such as those produced by Osaka Gas in Japan (MCMB 25–28, 10–28, or 6–28).

Suitable conductive additives for the anode composition include carbons such as coke, carbon black, carbon fibers, and natural graphite, metallic flake or particles of copper, stainless steel, nickel or other relatively inert metals, conductive metal oxides such as titanium oxides or ruthenium oxides, or electronically-conductive polymers such as polyaniline or polypyrrole. Preferred are carbon blacks with relatively low surface area such as Super P and Super S available from MMM Carbon in Belgium.

In a further preferred embodiment of the invention, a cathode is formed by combining and extruding into a film a composition comprising, by weight, 5–15%, preferably 8–10%, of a preferred lithium ionomer, 10–50%, preferably 20–30%, of a preferred solvent mixture, 40–80%, preferably 60–65%, of an electrode-active material, and 1–12%, preferably 5–8%, of a conductive additive. Optionally up to 12% of an inert filler or up to 10% of a mobile lithium salt as hereinabove described may also be added, as may such other adjuvants as may be desired by one of skill in the art which do not substantively affect the achievement of the desirable results of the present invention. It is preferred that no filler be used, and that no more than 5% of a mobile lithium salt be used.

Suitable for use as an electrode-active material in the cathode composition include transition metal oxides such as spinel $LiMn_2O_4$, layered $LiMnO_2$, $LiNiO_2$, $LiCoO_2$, $LiNi_xCo_yO_2$, and vanadium oxides such as $LiV_2O_5$, $LiV_6O_{13}$, or the foregoing compounds modified in that the compositions thereof are nonstoichiometric, disordered, amorphous, overlithiated, or underlithiated forms such as are known in the art. The suitable compounds may be further modified by doping with less than 5% of divalent or trivalent metallic cations such as $Fe^{2+}$, $Ti^{2+}$, $Zn^{2+}$, $Ni^{2+}$, $Co^{2+}$, $Cu^{2+}$, $Cr^{2+}$, $Fe^{3+}$, $Al^{3+}$, $Ni^{3+}$, $Co^{3+}$, or $Mn^{3+}$, and the like. Other electrode active materials suitable for the cathode composition include sulfur compounds such as solid sulfur, organic disulfides, or metal sulfides such as $TiS_2$ or $MoS_2$, electronically-conducting polymers such as polyaniline and its derivatives, polypyrrole derivatives, polyparaphenylene derivatives, polythiophene derivatives, or their copolymers, or mixtures of any of the above compounds. Particle size of the active material should range from about 1 to 100 microns. Preferred are transition metal oxides such as $LiMn_2O_4$, $LiNiO_2$, $LiCoO_2$, and $LiNi_xCo_yO_2$.

The conductive additives suitable for use in the process of making a cathode are the same as those employed in making the anode as hereinabove described.

In the most preferred embodiment of the present invention, the anode, cathode, and separator of a lithium battery cell, each as hereinabove described, is made by the extrusion process of the invention into a flat film or sheet, the films being brought together under anhydrous conditions in a layered structure with the separator being disposed between the anode and cathode films and metallic current collectors being disposed on either side of the layered structure, one or more of said layered structures then being thermally consolidated to form one or more lithium-ion cells. In a preferred embodiment, the current collectors are metallic meshes or foils pretreated with adhesion promoters such as mixtures comprising the ionomer employed in the process of the invention. The current collectors could also be metallized plastic materials or metallized carbon fiber webs. Especially preferred are 20 to 100 μm thick copper and aluminum expanded metal meshes for the anode and cathode, respectively.

Methods for thermally consolidating multi-layered structures comprising thermoplastic polymers are well known. These include calendering and hot pressing. It will be understood by one of skill in the art that numerous post-fabrication actions may be performed on the membranes and electrode films made by the process of the invention depending upon the particular needs of a specific application. These may include but are not limited to calendering, folding, cutting, stacking, removal of any excess gas volume, drying or extraction, solvent exposure, and the like.

The process of the present invention may be integrated into a larger process which also includes the steps of first hydrolyzing the non-ionic precursor polymer, performing the necessary ion exchange procedures to form the lithium ionomer, extracting protic solvent contamination, and further including steps such as battery assembly and packaging.

Providing anhydrous conditions throughout the process is an important feature for achieving excellent battery performance. The hygroscopic nature of ionomers makes removal of water preferentially to battery solvents a difficult undertaking. It is preferred to mix and compound dry ionomer with other dry components such as battery solvents and active materials directly prior to melt processing of the electrode and separator formulations. Then all following battery process steps should be kept under anhydrous conditions by using means known in the art such as enclosed environments with nitrogen or other inert gas purge, dry room conditions, or drying agents. The ionomer and other battery components can be dried individually or in combination using means known in the art such as vacuum, heating, or extractions followed by vacuum and/or heating.

The ionomers suitable for the practice of the present invention are typically exposed during preparation to protic solvents, most particularly water and methanol. It is known in the art that protic solvents such as these are deleterious to the performance of lithium batteries, even in very small concentrations. It has been found in the practice of the present invention that conventional means of drying, such as drying under vacuum, are ineffective at removing the most tightly bound solvents which have formed solvates with the ionic moiety of the polymer.

It is therefore highly preferred that in a step preliminary to combining the ionomer with the desired aprotic liquid in the process of the invention, to subject the ionomer to an additional solvent removal process, as follows. The ionomer is contacted with an inert liquid, such as toluene or xylene, which does not readily swell the ionomer. Introduced into the mixture is at least one additional substance, selected on the basis of its coordinating ability for lithium ion, battery component compatibility with other battery components, and vapor-liquid equilibrium properties, that substance being added in a sufficient quantity that the protic solvent is displaced thereby from the lithium ion, and is subsequently removed from the system by distillation or azeotropic distillation. It is recognized that solvate formation is a consideration for other ionomer applications, and that these may require other choices for the ion-ligating substance to be added. Suitable additional substances include organic carbonates, sulfones, phosphates, phosphine oxides, such as ethylene carbonate, propylene carbonate, tributyl phosphate, butylene carbonate, fluoro ethylene carbonate, g-butyrolactone, or sulfolane, or other uncharged, electron-pair donor substances.

Water content is conveniently determined by Karl Fisher titration on solid samples of ionomer powder. Using the above described procedures to dry the ionomer powder, water contents of less than 100 PPM can easily be achieved. Water content below 50 PPM is preferred for the ionomer powder.

EXAMPLES

In the Examples hereinbelow, ionic conductivity was determined following the method of Doyle et al, WO 98/20573.

All chemicals were used as received unless stated otherwise; water contents of anhydrous carbonate-based solvents used hereinbelow were less than 40 ppm as measured using Karl Fischer water analysis.

Example 1

A 1-liter vertical stirred autoclave was charged with 500 ml of an aqueous solution of ammonium perfluorooctanoate (7 g) and perfluoro-2-(2-fluorosulfonyl-ethoxy)propyl vinyl ether (PSEPVE) (29.0 g, 0.065 mol). The vessel was closed, twice pressured to 100 psi nitrogen and vented, cooled to about 5° C. and evacuated. Vinylidene fluoride (50.0 g, 0.78 mol) was added and the stirred (750 rpm) contents were heated to 60° C. A solution of potassium persulfate (0.08 g in 20 ml) was added over a 10 minute interval. When the pressure had decreased to ca. 130 psig, another 50 g of vinylidene fluoride was added. After the reaction was complete, the copolymer dispersion was heated to 50° C. and added to an equal volume of isopropanol with stirring. The coagulated product was filtered, washed with water, and dried in a nitrogen-purged vacuum oven at 100° C. There was obtained 97.1 g of white copolymer. DSC exhibited maximum of a broad melting transition at 146° C. (22.1 J/g). The composition was found to be 94.5 mol % VF2 and 5.5 mol % PSEPVE, as determined by a combination of $^1$H and $^{19}$F NMR. 19F NMR (acetone-d6): +45.57 (s), −78.0 to −80.0 (m's, a=2.968), −90.0 to −95.0 (m's, a=8.646), −108 to −116 (series of m, a=2.721), −121 to −127 (m's, a=1.004), −143 to −144.0 (m, a=0.499).

97.0 g (62.9 milliequivalents) of the copolymer so produced was suspended in 500 ml methanol and treated with 3.92 g Li2CO3. The resulting mixture was stirred and heated to reflux for 5 hr. After standing at room temperature for 18 hr, an additional 100 mL methanol was added and reflux was continued for 2 hr. $^{19}$F NMR of an aliquot showed >99% conversion of sulfonyl fluoride groups to lithium sulfonate moieties.

A portion of the methanol (100 mL) was removed under vacuum, and the resulting cold slurry was treated with 2 liters of cold water. The resulting mixture was subjected to portion-wise centrifuge isolation. The aqueous phase was decanted and the remaining water-laden polymer phase was dried in a nitrogen-purged vacuum oven at 100° C. for 48 hr. The resulting polymer crumb was cryoground to afford smaller particles which were further dried in a final storage bottle to constant weight (24 hr, 100° C.) using a nitrogen-purged vacuum oven.

$^{19}$F NMR (acetone-d6): −77 to −82 (bd signals, a=7.00), −91.2 (major s), −91.63, −93.39 and −95.06 (minor s, combined a=37.171), −108 to −112 (bd), bd singlets at −113.5 and −115.8, bd m at −117.2 (combined a=8.065), −123 (center of bd m, a=1.148), −127 (center of bd m, a=0.454), minor s at −125.8 (a=0.198), −145 (center of bd m, a 1.157), consistent with a composition consisting of mol % Li-PSEPVE=4.9%. DSC ($2^{nd}$ heat) showed peak of broad melting transition at 144.8° C. (15.8 J/g).

In a nitrogen purged glove box, 1 gram of the dried ionomer crumb was treated with 3 grams of a 1:1 by volume mixture of ethylene carbonate (EC, Selectipur, EM Industries) and propylene carbonate (PC, Selectipur, EM Industries) in a vial at room temperature and manipulated with a spatula. The vial was sealed and heated in a sand bath maintained at 130° C. Periodically, the contents were mixed with a spatula, until a uniform composition was obtained.

The resultant composition was placed between Kapton® sheets which were placed inside a sealed polyethylene bag, all of which was then placed within the preheated platens of a Pasadena hydraulic press at 125° C., and pressed using ca. 1000 lb applied force to produce a membrane sample ca. 10 cm square with a thickness of ca. 1.5 mil. After pressing, the membrane was transferred into a nitrogen-purged Vacuum Atmospheres glove box and opened. A 1.0 by 1.5 cm$^2$ sample of this membrane was cut using a knife and conductivity determined to be 3.73×10$^{-4}$ S/cm.

Example 2

A copolymer of VF2 and PSEPVE was synthesized according to the following method. 150 g of PSEPVE liquid was suspended in aqueous emulsion by combining with a solution of 35 g of ammonium perfluorooctanoate in 600 ml of distilled water using a Microfluidics, Inc. microfluidizer. The suspension was then diluted to 1 liter total volume with additional distilled water. The suspension so formed was charged to a nitrogen purged 4 liter horizontal autoclave equipped with a mechanical agitator, along with an additional 1500 mL of distilled water. The reactor was evacuated, then pressurized to 0 psig with vinylidene fluoride three times, then heated to 60° C., pressurized to 400 psig with vinylidene fluoride, and agitated at 200 rpm. A solution of aqueous potassium persulfate (0.6%, 50 mL) was added over a 5 min period. Reactor pressure was maintained at 400 psi until 220 g of VF2 had been fed after initiator addition. Agitation was stopped and the reactor was cooled and vented. The resulting milky dispersion was frozen and thawed to coagulate the product which was filtered through Nylon cloth and washed with water repeatedly to remove surfactant. After air drying, polymer crumb was dried in a nitrogen-purged vacuum oven at 100° C. for 24 hr to give 350 g of product. $^{19}$F NMR data (acetone): +45.2 (s, a=1.00), −78.0 to −80.0 (m's, a=7.876), −90.0 to −95 (m's, a=21.343), −108 to −116 (series of m, a=6.446), −122.0 to −127.5 (m's, combined a=2.4296), −143.0 (bd s, a=1.283), consistent with mol % PSEPVE=9.1%. Within experimental error, all of the liquid comonomer charged to the reactor was accounted for in the collected product copolymer. TGA (10°/min, N2): no weight loss until 375° C. DSC (20°/min): maximum of broad melting transition at 159.1° C. (23.1 J/g); Tg=−23° C.

A 3-liter 3-neck flask fitted with overhead paddle stirrer (Teflon* bearing), reflux condenser, and thermocouple port was charged with 200 g of the VF2/PSEPVE copolymer (183.4 mequivalents of SO$_2$F), methanol (1700 mL), and lithium carbonate (13.6 g, 184 mequiv.). The mixture was stirred for 24 hr at room temperature. Toluene (300 mL) was added, and the mixture was heated to reflux in order to remove solvent. Methanol/toluene azeotrope was collected while additional toluene was added to keep volume in the reactor unchanged. Distillation was continued until the polymer had precipitated and the distillate temperature had reached ca. 108° C. Propylene carbonate (15.8 mL, 18.8 g distilled, stored over sieves) was added, and distillation was continued until the distillate was free of methanol. The slurry was cooled to room temperature and filtered using a dry, nitrogen-purged pressure funnel. Residual toluene was removed under nitrogen, and the product was transferred in a dry atmosphere to provide 221.7 g as a free-flowing, white powder.

$^{19}$F NMR (acetone-d6) featured: −76 to −82 (bd signals, a=7.00), −91.2 (major s), −91.65, −93.4 and −95.06 (minor s, combined a=18.418), −108 to −112 (bd), bd singlets at −113.5 and −115.8, bd m at −117.2 (combined a=5.328), −123 (center of bd m) and −127 (center of bd m, combined a=2.128), −145 (center of bd m, a=1.212). Integration was consistent with 9.5 mol % Li-PSEPVE.

$^1$H NMR (acetone-d6) was consistent with one propylene carbonate molecule per polymer-bound lithium ion.

Example 3

In a nitrogen-purged Vacuum Atmospheres glove box 0.5 g of the dried crumb of the lithium ionomer of Example 2 were mixed with 1.5 grams of a 1:1 by volume mixture of EC and PC (EC and PC both Selectipur grade, EM Industries) in a glass vial which was sealed and heated to 100° C. for several hours to mix thoroughly. This mixture was then cooled to form a gel and then, still in the nitrogen-purged glove box, placed between two 5 mil thick sheets of Kapton® polyimide film (DuPont) and the resulting sandwich placed between the platens of a Carver Hydraulic Unit Model #3912 preheated to 105° C. and pressed with a ram force of 1,000 lbs. The film that resulted was clear and uniform and ca. 125 μm in thickness. Once cooled to room-temperature, a 1.0 by 1.5 cm sample of this membrane was cut using a knife and the conductivity was determined to be $8.18 \times 10^{-4}$ S/cm.

Example 4

70.9 g of $CF_2BrCFBrOCF_2CF(CF_3)OCF_2CF_2SO_2N(K)SO_2CF_3$, prepared according to the method of Xue (Ph.D. thesis, Clemson University, 1996), was dissolved in 100 ml anhydrous DMF. Zn-dust (7.05 g 108 mmol) was added to the solution and the mixture was stirred for 60 min at room temperature. The mixture was filtered and most of the solvent was removed under vacuum. The residue was combined with 300 mL of 6N HCl forming a brown, oily mixture which was stirred for 5 min and then four times extracted with fresh 100 ml aliquots of diethyl ether. The diethyl ether fractions were combined and washed three times with fresh 100 ml aliquots of deionized water. The ether was evaporated under vacuum and the remaining brown oil was subjected to two shortpath distillations to obtain 50.6 g of the acid product $CF_2=CFOCF_2CF(CF_3)OCF_2CF_2SO_2N(H)SO_2CF_3$.

34.08 g (59.26 mmol) of an acid product synthesized as hereinabove, was dissolved in 25 ml deionized water followed by addition of 121.1 ml of a 0.489N LiOH solution. Water was removed under vacuum and the residue was dried at 100° C. for 24 h. Yield was 34.09 g of $CF_2=CFOCF_2CF(CF_3) OCF_2CF_2SO_2N(Li)SO_2CF_3$ $^{19}$F-NMR in $D_2O$: (8F, −77.8—−79.5 ppm; 2F, −86.0 ppm; 1F,−115.5ppm; 2F, −117.3 ppm; 1F, −123.4 ppm; IF, −137.7 ppm; 1F, −146.1 ppm); elemental analysis: N (2.45% found, 2.41% theor.), F (49.43% found, 52.31% theor.), Li (1.15% found, 1.19% theor.), S (10.83% found, 11.03% theor.).

12.80 g of the $CF_2=CFOCF_2CF(CF_3)OCF_2CF_2SO_2N(Li)SO_2CF_3$ was dissolved in 400 g deionized water and reacted with 29 g of vinylidene fluoride at 60° C. after the addition of 20 ml of a solution of 0.200 g potassium persulfate in 50 g deionized water, according to the teachings of Connolly et al, op.cit. The VF2-copolymer was isolated by lyophilization and dried at 110° C. for 22 h to yield 40.7 g of ionomer having 4.7 mol-% of the lithium imide-functionalized comonomer as confirmed by $^{19}$F NMR. Elemental analysis: H (2.06% found, 2.16% theor.), N (1.78% found, 0.74% theor.), Li (0.32% found, 0.37% theor.). DSC (N2,10° C./min, $2^{nd}$ heat) showed melting point at 164.5° C. $^1$H NMR (acetone-d6): $CH_2$ at 3.60 ppm. $^{19}$F NMR (acetone-d6): −77.2—−79.2 ppm (m), −91.2—−130.0 ppm (series of m); −144.6 (sidechain CF). 4.7 mole % PSEPVE imide in VF2 according to the integration.

0.50 grams of the dried ionomer crumb were combined in a glass vial with 0.5 grams of the VF2/Li-PSEPVE ionomer of Example 2 and 2.0 grams of a 1:1 by volume mixture of EC and gamma-butyrolactone (GBL, Selectipur, EM Industries). The contents were mixed by hand using a spatula then the vial was heated to 100° C. while sealed and under nitrogen purge for several hours umtil a homogeneous and clear mixture resulted.

This mixture was cooled to form a gel and hot pressed as in Example 3 except that the temperature was 105° C. The film that resulted was clear and uniform and 105–120 microns in thickness. Once cooled to room temperature, a 1.0 cm by 1.5 cm membrane sample from this hot pressed film was cut using a knife and the ionic conductivity was determined to be $8.27 \times 10^{-4}$ S/cm.

Example 5

Inside the dry-nitrogen purged Vacuum Atmospheres glove box, 2.375 g of the dried VF2/Li-PSEPVE ionomer of Example 2 was combined in a 50-ml glass jar with 15.5 grams (62 wt %) of $LiCoO_2$, from EM Industries, 1.75 grams of Super P carbon black, from MMM Carbon, 5.375 grams of a 1:1 by volume mixture of ethylene carbonate and propylene carbonate, Selectipur, EM Industries, to form an extrudable cathode composition.

The mixture was melt-compounded in a CSI-Max extruder, model CS-194. Extrusion conditions were as follows:

| | |
|---|---|
| Rotor temperature: | 120° C. |
| Header temperature: | 120° C. |
| Gap between rotor and header: | 0.13 cm |
| Rotor speed: | 140 rpm. |

The melt-compounded material was extruded through a circular die with a diameter of 0.32 cm, and was collected in a glass jar purged with dry nitrogen. A sample of the extruded material was collected and transferred into a Vacuum Atmospheres Glove Box with a positive pressure of nitrogen inside a sealed container.

A 1.0 gram quantity of the extrudate was melt-pressed as in Example 3 except that the temperature was 130° C. and the ram force was 20,000 lbs to form a film of ca. 150 microns thickness. A 12 mm diameter specimen was punched out of this film using a brass punch. An 18 mm diameter separator film was punched out using the melt pressed film of Example 3. Neither of these films were exposed to or contained any mobile lithium salts.

While still contained within a glove box environment, these cathode and separator films were assembled into size 2325 coin cells with 3 layers of ca. 100 micron thick lithium metal as the anode. The coin cell was cycled at the C/5 rate for both charge and discharge at room temperature between the voltage limits of 4.2 V and 2.8 V. Capacity during the first charge for the $LiCoO_2$ cathode was 156.2 mAh/g, while capacity for the first discharge was 135.8 mAh/g, giving a reversibility of 86.9%. The cell still retained 80% of its initial capacity even after over 100 identical charge-discharge cycles.

Example 6

Inside the dry-nitrogen purged Vacuum Atmospheres glove box, 1.75 g of the dried ionomer copolymer of VF2 with the lithium sulfonimide derivative of PSEPVE prepared in Example 4 was combined in a 50-ml glass jar with 0.625 g of Kynar Flex® 2801 polyvinylidene fluoride-hexafluoropropylene copolymer from Atochem, 15.5 grams of $LiCoO_2$, from EM Industries, 1.625 grams of Super P carbon black from MMM Carbon, and 5.5 grams of a 1:1 by volume mixture of EC and gamma-butyrolactone (GBL), Selectipur, EM Industries to form an extrudable cathode composition.

The mixture was melt-compounded in a CSI-Max extruder, model CS-194. Extrusion conditions were as follows:

| | |
|---|---|
| Rotor temperature: | 110° C. |
| Header temperature: | 110° C. |
| Gap between rotor and header: | 0.13 cm |
| Rotor speed: | 192 rpm. |

The melt-compounded material was extruded through a circular die with a diameter of 0.32 cm, and was collected in a glass jar purged with dry nitrogen. A sample of the extruded material was sealed inside the glass jar and transferred into a Vacuum Atmospheres Glove Box with a positive pressure of nitrogen.

A 1.0 gram quantity of the above extrudate was melt-pressed as in Example 3 except that the temperature was 110° C. and ram force was 20,000 lbs to form films of ca. 125 microns thickness. A cathode film having a 12 mm diameter was punched out of this film using a brass punch. An 18 mm diameter separator film was punched out from the film of Example 4. Both of these films were immersed for 2 hours into an electrolyte solution composed of 1.0 M LiPF6 in 1:1 EC/GBL using a 20 ml glass vial.

This cathode and separator film were assembled into size 2325 coin cells with 3 layers of ca. 100 micron thick lithium metal as the negative electrode. The coin was cycled at the C/5 rate for both charge and discharge at room temperature between the voltage limits of 4.2 V and 2.8 V. Capacity during the first charge for the $LiCoO_2$ cathode was 157.2 mAh/g, while capacity for the first discharge was 149.7 mAh/g, giving a reversibility of 95.2%. Capacity on the tenth discharge was 147.1 mAh/g and the coin cell achieved nearly 100 cycles to 80% of its initial capacity.

Example 7

The reservoir of a Microfluidics Inc. MicroFluidizer™ was charged with a solution of 35 g ammonium perfluorooctanate in 600 ml demineralized water. The pump was started and the fluids allowed to recycle to mix the surfactant solution with the 50 ml of pure demineralized water held up within the apparatus. 150 g of PSEPVE was added to the reservoir and the system allowed to recycle for 20 min to produce a well dispersed PSEPVE emulsion. The outflow was then directed to a 1 liter volumetric flask. After the reservoir was pumped down, 150 ml demineralized water was added and pumped through the system to flush the remaining PSEPVE emulsion through and bring the level in the volumetric flask up to the mark.

A 4-L horizontal autoclave with mechanical agitator was purged with nitrogen and charged with the so-formed pre-emulsified PSEPVE. The reactor was flushed by three cycles of evacuating followed by pressurizing to 0 psig with vinylidene fluoride. The reactor was again evacuated and heated to 60° C., pressurized to 300 psig with vinylidene fluoride, and agitated at 200 rpm. A solution of aqueous potassium persulfate (0.6%, 50 mL) was added over a 5 min period. Reactor pressure was maintained at 300 psi until 220 g of the pre-emulsified PSEPVE solution had been fed after initiator addition. Agitation was stopped and the reactor was cooled and vented. The resulting milky dispersion was frozen and thawed to coagulate the product which was filtered through nylon cloth and washed with water repeatedly to remove surfactant. After air drying, polymer crumb was dried in a nitrogen-purged vacuum oven at 100° C. for 24 hr to give 364 g of product. $^{19}F$ NMR (acetone): +45.2 (s, a=1.00), −78.0 to −80.0 (m's, a=7.000), −90.0 to −95 (m's, a=17.59), −108 to −116 (series of m, a=5.848), −122.0 to −127.5 (m's, combined a=2.357), −145.4 (bd s, a=1.155), consistent with mol % PSEPVE=9.5%. TGA (10% /min, N2): no weight loss until 375° C. DSC (20%/min): maximum of broad melting transition at 162° C. (23.3 J/g); Tg=−20° C.

Example 8

A 3-liter 3-neck flask fitted with an overhead paddle stirrer, reflux condenser, and thermocouple port was charged with 200 g of the VF2/PSEPVE copolymer so formed, 1600 ml of methanol, and 13.71 g of lithium carbonate. The mixture was stirred for 48 hr at room temperature. 400 ml of toluene was added, and the mixture was heated to reflux in order to remove solvent. The methanol/toluene azeotrope was collected while additional toluene was added to keep the volume in the reactor unchanged. Distillation was continued until the polymer had precipitated and the distillate temperature had reached ca. 108° C. 16.7 g of ethylene carbonate was dissolved in toluene and added and distillation was continued until the distillate was free of methanol. The residual slurry was cooled to room temperature and filtered using a dry, nitrogen-purged pressure funnel. Most of the adsorbed toluene was removed under nitrogen, and residual amount was removed under reduced pressure. The product was transferred in a dry atmosphere to provide 218.0 g as a free-flowing, white powder. Karl Fisher titration, which involves measuring the quantity of water evolved at 180° C. showed that the water content of the white powder produced was ca. 24 ppm.

$^{19}F$ NMR (acetone-d6) featured: −77 to −82 (bd signals, a=7.00), −91.2 (major s), −91.64, and −95.06 (minor s, combined a=17.045), −106 to −112 (bd), bd singlets at −113.5 and −115.8, bd m at −117.2 (combined a=5.243), −122 to −127.5 (center of bd m, combined a=1.988), −145 (center of bd m, a=1.095). Integration was consistent with 9.5 mol % Li-PSEPVE.

Anode material was prepared by weighing and hand-mixing the following materials in a 225-ml glass jar inside a glove box under a dry nitrogen atmosphere:

5.4 grams of the lithium ionomer so formed,
  34.8 grams of MCMB 6-28 graphite from Osaka Gas Chemicals Co.,
  2.4 grams of Super P carbon black from MMM Carbon, and
  17.4 grams of a 0.1 M solution of bis(perfluoroethyl sulfonyl) imide lithium salt dissolved in a 2/1 mixture by weight of ethylene carbonate and butylene carbonate (0.1 M solution of BETI in a 2/1 mixture of EC/BC).

The mixture for mormed was melt-compounded in a CSI-Max extruder, model CS-194. Extrusion conditions were as follows:

Rotor temperature: 125° C.
  Header temperature: 125° C.
  Gap between rotor and header: 0.13 cm
  Rotor speed: 192

The melt-compounded material was extruded through a 0.32 cm diameter single strand die, and was collected in a glass jar purged with dry nitrogen.

Cathode material was prepared following the same procedure as that for the anode, except that the composition fed to the extruder consisted of:

5.1 grams (8.5 wt %) of the same Li ionomer used in the anode above, 34.8 (58 wt %) of LiCoO2 from EM Industries, 4.2 grams (7 wt %) of Super P carbon black, from MMM Carbon, and 15.9 grams (26.5 wt %) of a 0.1M solution of LiN(SO$_2$CF$_2$CF$_3$)$_2$ in a 2/1 mixture of EC/BC.

Extrusion conditions were the same except that the rotor and header temperatures were 130° C.

Separator material was formed from a composition consisting of:

7.5 grams (25 wt %) of the Li ionomer used in the anode and cathode, 3 grams (10 wt %) of Cab-O-Sil TS-530, from Cabot Co., and 19.5 grams (65 wt %) of a 0.1M solution of LiN(SO$_2$CF$_2$CF$_3$)$_2$ in a 2/1 mixture of EC/BC.

Extrusion conditions were the same as for the cathode material except that the rotor and header temperatures were 110° C.

The extruded strands of cathode, anode, and separator were placed into a second nitrogen-purged dry box. Samples were placed in Kapton® bags, then calendered between hot steel rollers to form films approximately 60 mm wide. Brass foil shims were used to keep the rollers a minimum distance apart. The temperatures of the calendering rollers were 135° C., 125° C., and 125° C. for the cathode, anode, and separator, respectively. The cathode film had a weight of 37 mg/cm$^2$, the anode was 18 mg/cm$^2$, and the separator was approximately 75 m thick. Inside the dry box, 45×55 mm rectangular electrodes were from the anode and cathode films so prepared. A bicell was fabricated by laminating the layers together to make a stack consisting of Al/C/S/A/Cu/A/S/C/Al, where C is cathode, S is separator, A is anode, Al is aluminum mesh, and Cu is a copper mesh. After lamination, the bicell was immediately packaged into a foil laminate bag, with no extraction or electrolyte addition steps. The bicell was cycled between voltage limits of 2.7 and 4.15 V. The first charge capacity was 148 mAh (142 mAh/g of LiCoO2), the first discharge capacity was 102 mAh, and the 61$^{st}$ cycle capacity was 76 mAh.

Example 9

In ambient laboratory conditions, 58.0 g (58 wt. %) of LiCoO$_2$, from FMC Corporation, 5.00 g of Super P carbon black from MMM Carbon, 2.00 g of Ensaco 350 carbon black, from MMM Carbon, 8.00 g of the VF2-Li-PSEPVE ionomer prepared in the manner of Example 2 were mixed manually in a jar. The powder was then added to a Waring blender in a 200 ml mixing bowl. The dry powders were mixed in the blender at a low speed setting with a rheostat setting of 50% for ~1 minute. 27.00 g of a 1 :1 by weight mixture of ethylene carbonate and propylene carbonate, both from EM Industries, was added to the powder mixture. The mixture was blended again for ~1 minute and placed into a glass jar.

The cathode mixture so-formed was then added to a 75 ml mixing bowl of a Haake Model EU5 Torque Rheometer. The melt temperature of the mixing bowl was set at 120° C. The cathode mixture was added in small portions to the bowl with the mixing drive set at 18 rpm. Powder addition was completed over a period of 2 minutes. The Haake rheometer was then set at 25 rpm, and the cathode mixture was processed for an additional 10 minutes. The resulting cathode mixture was then collected in a jar and enclosed.

A sample of the cathode mixture was then pre-densified in a platten press at about 120° C. The compressed sample was then calendered into film form with a Western Magnum laminator with steel rolls. The rolls were set at 110° C. Brass shims were used to control the minimum separation of the two steel rolls and hence the thickness of the film. The resulting cathode film had a weight of 42 mg/cm$^2$, and thickness of 0.163 mm. Electronic conductivity of the film was measured to be 292 mS/cm.

An anode mixture was also processed in the Haake Torque Rheometer in a manner analogous to the cathode mixture. The composition of the anode mixture was 64.00 g MCMB 25–28 graphite from Osaka Gas Chemicals Co., 8.00 g of the VF2-Li-PSEPVE ionomer, 4.5 g of Super P carbon black, from MMM Carbon, and 23.5 g of a 1:1 by weight mixture of ethylene carbonate and propylene carbonate, both from E M Industries. The melt processing conditions used were the same as for the cathode mixture except that the film calendering temperature used was 90° C. and a thinner brass shim was used to achieve a thinner anode film for cell capacity balancing purpose. The resulting anode film was 0.116 mm thick. Electronic conductivity of the film was measured to be 1480 mS/cm.

Inside a dry-nitrogen purged Vacuum Atmospheres dry box, 3.00 g of a 2:1 by weight mixture of ethylene carbonate (E M Industries)/butylene carbonate (Huntsman Chemical Co.) was added to 1.00 g of the VF2-Li-PSEPVE ionomer to form a separator mixture. The mixture was mixed manually with a spatula in a glass vial. A sample of this separator mixture was calendered into a film form inside the same dry box with a laminator with steel rolls. The resulting separator film had a thickness of 0.080 mm.

Circular films with diameter of 12.7 mm were cut out of the calendered cathode and anode films with a punch tool. The electrode films were extracted of their ethylene carbonate and propylene carbonate contents by solvent extraction using an excess quantity of diethyl ether. The electrode films were then dried in the antechamber of a dry argon filled dry box and moved inside the box. A 19-mm diameter circular film was cut from the separator film and moved into the argon filled dry box via a glass vial. Having been prepared in a dry nitrogen box, the separator film was not dried through the antechamber. Inside the argon filled dry box, 0.0167 g and 0.0075 g of the 2:1 by weight mixture of ethylene carbonate/butylene carbonate was added to the cathode and anode pieces, respectively. The weights of the dried, carbonate-free, 12.7 mm diameter cathode and anode pieces being 0.0491 g and 0.0225 g, respectively.

The cathode, separator, and anode films were assembled into a size 2325 coin cell. The coin cell was charged and discharged at room temperature between voltage limits of 2.8V and 4.2V. The capacity of the coin cell was 155.4 mAh/g of LiCoO2 and 103.4 mAh/g of LiCoO2 for the first charge and first discharge, respectively.

We claim:

1. A process for forming ionically conductive shaped articles the process comprising:

combining in a vessel provided with a mixing means a polymer comprising monomer units of vinylidene fluoride and 2–50 mol-% of a perfluoroalkenyl monomer unit having a pendant group comprising the radical represented by the formula

 (I)

wherein

R and R' are independently selected from F, Cl or a perfluoroalkyl group having 1 to 10 carbon atoms, optionally substituted by one or more ether oxygens;

a=0, 1 or 2;

b=0 to 6;

$M^+$ is $H^+$ or a univalent metal cation;

X is O, C or N with the proviso that d=0 when X is O and d=1 otherwise, and c=1 when X is C and c=0 when X is N;

when c=1, Y and Z are electron-withdrawing groups selected from the group consisting of CN, $SO_2R_f$, $SO_2R^3$, $P(O)(OR^3)_2$, $CO_2R^3$, $P(O)R^3_2$, $C(O)R_f$, $C(O)R^3$, and cycloalkenyl groups formed therewith wherein $R_f$ is a perfluoroalkyl group of 1–10 carbons optionally substituted with one or more ether oxygens;

$R^3$ is an alkyl group of 1–6 carbons optionally substituted with one or more ether oxygens, or an aryl group optionally further substituted; or, when c=0, Y may be an electron-withdrawing group represented by the formula —$SO_2R_f'$ where $R_f'$ is the radical represented by the formula

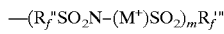

where m=0 or 1, and $R_f''$ is —$C_nF_{2n}$— and $R_f'''$ is —$C_nF_{2n+1}$ where n=1–10, optionally substituted with one or more ether oxygens and, a polar aprotic liquid to form a composition; mixing said composition, at a temperature above the melting point of said composition, at least until it is plastically formable; and forming a shaped article from said plastically formable composition by the application of heat and/or pressure thereto.

2. The process of claim 1 further comprising the step of separating said shaped article from said heat and/or pressure.

3. The process of claim 1 wherein the polymer comprises 4–12 mol-% of perfluoroalkenyl monomer units.

4. The process of claim 1 wherein X is O.

5. The process of claim 1 wherein $M^+$ is an alkali metal cation.

6. The process of claim 8 wherein $M^+$ is a lithium cation.

7. The process of claim 1 wherein a=0 or 1, R=$CF_3$, R'=F, and b=1.

8. The process of claim 1 wherein the polymer further comprises up to 20 mol-% of monomer units selected from the group consisting of tetrafluoro-ethylene, trifluoroethylene, chlorotrifluoroethylene, vinyl fluoride, hexafluoro-propylene, perfluoromethyl vinyl ether, perfluoroethyl vinyl ether, ethylene, propylene, 1-octene, isobutylene, ethyl vinyl ether, acrylic acid and the alkyl esters thereof, and methacrylic acid and the alkyl esters thereof, and mixtures thereof.

9. The process of claim 7 wherein $M^+$ is $Li^+$ and the composition comprises a weight ratio of aprotic liquid to ionomer in the range of 0.5 part aprotic liquid to 1 part of ionomer, to 12 parts aprotic liquid to 1 part ionomer.

10. The process of claim 9 wherein the composition comprises a weight ratio of aprotic liquid to ionomer in the range of 4 parts of aprotic liquid to 1 part of ionomer, to 2 parts of aprotic liquid to 1 part of ionomer.

11. The process of claim 9 wherein the composition comprises 5–20% by weight of the ionomer, 10–60% by weight of the aprotic liquid, further comprising 45–80% by weight of one or more electrode-active materials selected from the group consisting of carbon, metal oxides, lithium-alloy-forming compounds, transition metal oxides, sulfur compounds, and electronically conductive polymers; and 1–12% of one or more conductive particles selected from the group consisting of carbon, metal, conductive metal oxides, and electronically conductive polymers.

12. The process of claim 11 wherein the electrode active material is selected from the group consisting of carbon microbeads, natural graphites, carbon fibers, $LiMn_2O_4$, $LiNiO_2$, $LiCoO_2$, and $LiNi_xCo_yO_2$, and mixtures thereof, and the conductive additive is a carbon black of surface area less than about 20 $m^2/g$.

13. The process of claim 1 wherein the aprotic liquid is selected from the group consisting of the linear and cyclic carbonates, esters, diesters, lactones, amides, sulfoxides, sulfones, and ethers.

14. The process of claim 13 wherein the aprotic liquid is a mixture of one or more cyclic carbonates, diesters, linear carbonate, or lactones.

15. The process of claim 14 wherein the cyclic carbonates, diesters, or lactones are selected from the group consisting of ethylene carbonate, propylene carbonate, butylene carbonate, vinylene carbonate, dimethyl succinate, diethyl succinate, dimethyl glutarate, dimethyl adipate, gamma-butyrolactone, and fluoro or chloro-substituted cyclic carbonates.

16. The process of claim 14 wherein the linear carbonates are selected from the group consisting of dimethyl carbonate, diethyl carbonate, dipropyl carbonate, ethyl methyl carbonate, methyl propyl carbonate, and fluoro and chloro substituted linear carbonates.

17. The process of claim 14 wherein the mixture is selected from the group consisting of a mixture of ethylene carbonate and gamma-butyrolactone, ethylene carbonate and dimethyl succinate, and a mixture of ethylene carbonate with propylene carbonate.

18. The process of claim 17 wherein the mixture is a mixture of ethylene carbonate with propylene carbonate in a weight ratio in the range of 50:50 to 80:20.

19. The process of claim 1 wherein the composition further comprises up to 50% by weight on the total weight of ionomer plus aprotic liquid an inert filler selected from the group consisting of polyvinylidene fluoride homopolymer, polytetrafluoroethylene homopolymer, polyolefins, polyvinylidene fluoride-hexafluoropropylene copolymers, polyurethanes, polyalkylene oxides, polyacrylonitriles, polymethylacrylates, $TiO_2$, $SiO_2$, or $Al_2O_3$.

20. The process of claim 1 further comprising up to 15% by weight on the total weight of ionomer plus aprotic liquid of a mobile lithium salt selected from the group consisting of $LiPF_6$, $LiPF_xR_{fy}$, $LiBF_4$, LiAsF6, LiClO4, LiSO3Rf, LiN(SO2Rf)(SO2Rf), LiC(SO2Rf)(SO2Rf)(SO2Rf) and mixtures thereof, where the "f" subscript denotes partial or complete fluorination. The $R_f$ groups are electron-withdrawing, and may respectively be the same or different from one another.

21. The process of claim 20 wherein the mobile lithium salt is $LiPF_6$ or $LiN(SO_2CF_2CF_3)_2$.

22. The process of claim 1 wherein the vessel is a continuous plasticating extruder.

23. The process of claim 22 wherein the shaped article is formed by casting a film or sheet by passing the plastically formable composition through an extrusion die.

24. The process of claim 1 wherein the shaped article is formed from the plastically formable composition by calendering, thermoforming, injection molding, or compression molding.

25. The process of claim 1 further comprising the step of forming a layered structure comprising the shaped article.

26. A shaped article made by the process of claim 1.

27. The shaped article of claim 8 wherein a=0 or 1, R=CF$_3$, R'=F, b=1, and M$^+$ is Li$^+$.

28. An electrochemical cell comprising the shaped article of claim 26.

29. The electrochemical cell of claim 28 wherein a=0 or 1, R=CF$_3$, R'=F, b=1, and M$^+$ is Li$^+$.

30. A process for forming an electrochemical cell, the process comprising combining in a vessel provided with a mixing means a polymer comprising monomer units of vinylidene fluoride and 2–50 mol-% of a perfluoroalkenyl monomer unit having a pendant group comprising the radical represented by the formula $$-(OCF_2CFR)_aOCF_2(CFR')_bSO_2X^-(M^+)[YZ_c]_d \quad (I)$$

wherein

R and R' are independently selected from F, Cl or a perfluoroalkyl group having 1 to 10 carbon atoms, optionally substituted by one or more oxygens;

a=0, 1 or 2;

b=0 to 6;

M$^+$ is H$^+$ or a univalent metal cation; X is O, C or N with the proviso that d=0 when X is O and d=1 otherwise, and c=1 when X is C and c=0 when X is N;

when c=1, Y and Z are electron-withdrawing groups selected from the group consisting of CN, SO$_2$R$_f$, SO$_2$R$^3$, P(O)(OR$^3$)$_2$, CO$_2$R$^3$, P(O)R$^3{}_2$, C(O)R$_f$C(O)R$^3$, and cycloalkenyl groups formed therewith wherein R$_f$ is a perfluoroalkyl group of 1–10 carbons optionally containing one or more oxygens;

R$^3$ is an alkyl group of 1–6 carbons optionally containing oxygen, or an aryl group optionally further substituted;

or, when c=0, Y is an electron-withdrawing group represented by the formula —SO$_2$R$_f'$ where R$_f'$ is the radical represented by the formula $$-(R_f''SO_2N^-(M^+)SO_2)_mR_f'''$$

where m=0 or 1, and R$_f''$ is —C$_n$F$_{2n}$— and R$_f'''$ is —C$_n$F$_{2n+1}$ where n=1–10 and, a polar aprotic liquid to form a composition; mixing said composition, at a temperature above the melting point of said composition, at least until it is plastically formable; and, forming a shaped article from said plastically formable composition by the application of heat and/or pressure thereto; layering said shaped article with at least one of such other articles as are required to make an electrochemical cell selected from the group consisting of a positive electrode, a separator, a negative electrode, and a current collector; and, consolidating said layered articles to form an electrochemical cell.

31. A process for forming ionically conductive shaped articles, the process comprising:

combining in a vessel provided with a mixing means a polymer comprising monomer units of vinylidene fluoride and 2–50 mol-% of a perfluoroalkenyl monomer unit having a pendant group comprising the radical represented by the formula $$-(OCF_2CFR)_aOCF_2(CFR')_bSO_2C^-(M^+)YZ \quad (I)$$

wherein

R and R' are independently selected from F, Cl or a perfluoroalkyl group having 1 to 10 carbon atoms, optionally substituted by one or more ether oxygens;

a=0, 1 or 2;

b=0 to 6;

M$^+$ is H$^+$ or a univalent metal cation;

Y and Z are CN or CO$_2$C$_2$H$_5$; mixing said composition at least until it is plastically formable; and forming a shaped article from said plastically formable composition by the application of heat and/or pressure thereto.

32. A process for forming ionically conductive shaped articles, the process comprising:

combining in a vessel provided with a mixing means a polymer comprising monomer units of vinylidene fluoride and 2–50 mol-% of a perfluoroalkenyl monomer unit having a pendant group comprising the radical represented by the formula $$-(OCF_2CFR)_aOCF_2(CFR')_bSO_2\ N^-(M^+)Y \quad (I)$$

wherein

R and R' are independently selected from F, Cl or a perfluoroalkyl group having 1 to 10 carbon atoms, optionally substituted by one or more ether oxygens;

a=0, 1 or 2;

b=0 to 6;

M$^+$ is H$^+$ or a univalent metal cation;

Y is SO$_2$R$_f$ where R$_f$ is CF$_3$ or C$_2$F$_5$;

and, a polar aprotic liquid to form a composition; mixing said composition at least until it is plastically formable; and forming a shaped article from said plastically formable composition by the application of heat and/or pressure thereto.

* * * * *